United States Patent Office 2,712,548
Patented July 5, 1955

2,712,548

METHOD OF PRODUCING MONOHYDROXY MONOHYDROCARBONOXY PHOSPHORYL MONOFLUORIDES

Archie Hood, Houston, Tex., assignor to Ozark-Mahoning Company, Tulsa, Okla., a corporation of Delaware No Drawing. Application September 3, 1953,
Serial No. 378,415

6 Claims. (Cl. 260—461)

This invention relates to the preparation of organic phosphoryl monofluorides and is particularly directed to a novel method of producing monohydroxy monohydrocarbonoxy phosphoryl monofluorides of the general character of those disclosed in United States Letters Patent 2,614,116, granted October 14, 1952, to Willy Lange and said Archie Hood.

In the method of that patent a neutral phosphoric or polyphosphoric acid ester of an organic compound of the aliphatic series is reacted with an appropriate quantity of liquid anhydrous hydrogen fluoride under suitable conditions to produce a mixture containing an orthophosphoric acid di-ester, a monohydroxy monohydrocarbonoxy phosphory monofluoride and also usually a di-hydrocarbonoxy phosphoryl monofluoride; these reaction products must thereafter be separated by somewhat complicated procedures to obtain any one of them in a pure state. Moreover, the said method requires the use of the highly corrosive anhydrous hydrogen fluoride the handling of which without great care and special precautions is extremely hazardous.

It is therefore a principal object of the present invention to provide a method of producing monohydroxy monohydrocarbonoxy phosphoryl monofluorides by use of ingredients relatively safe to handle and which results in a product readily separable from the reaction mass in substantially pure state by relatively simple procedures.

A further object is to provide a method of making such monofluorides wherein a monohydric aliphatic alcohol reacts under suitable conditions with difluorophosphoric acid ($HPO_2F_2$) to produce the monohydroxy monohydrocarbonoxy phosphoryl monofluoride corresponding to the said alcohol.

Other objects, purposes and advantages of the invention will hereafter more fully appear or will be understood from the following description of certain procedures utilized in accordance therewith for the preparation of typical compounds, sometimes known as half esters, by the alcoholysis of difluorophosphoric acid, hereinafter for convenience termed "di-acid," in conformity with the following typical reaction:

$$ROH + HPO_2F_2 = (RO)(HO)POF + HF \quad (1)$$

in which R represents the hydrocarbon group of any monohydric aliphatic alcohol, amount the simplest of which is the ethyl group $C_2H_5$ of ethyl alcohol, ($C_2H_5OH$).

When ethyl alcohol is introduced in substantially stoichiometric proportions to di-acid in accordance with Equation 1 considerable heat is initially liberated indicating the reaction proceeds rapidly and pursuant to the invention the reaction mass is subjected to a fairly prolonged vacuum treatment at a temperature sufficient to distill off unreacted alcohol and di-acid if any of either remains and also such residual HF as may be produced by the reaction, leaving relatively pure monohydroxy monoethoxy phosphoryl monofluoride.

More specifically as an example of the procedure, to 61.0 g. of di-acid ($HPO_2F_2$) in a platinum bottle there was added 27 g. anhydrous ethyl alcohol ($C_2H_5OH$) in substantially stoichiometric proportion to the $HPO_2F_2$. The mixture was allowed to stand overnight at room temperature and then subjected to vacuum treatment for about 3 hours in a water jacket in which the jacket temperature was maintained between 55° and 60° C., a temperature sufficient under these conditions to distill off ethyl alcohol and the di-acid. At the conclusion of the vacuum treatment the 65 g. of liquid remaining undistilled was analyzed and showed 15.0% F. corresponding to the theoretical value of 14.84% F. in monohydroxy mono-ethoxy phosphoryl monofluoride ($C_2H_5O$)(HO)POF. High vacuum short path distillation of this product and further analysis of separated fraction indicated that the original reaction product, before vacuum treatment, had contained as much as 56% of the said monofluoride and 16% monofluorophosphoric acid ($H_2PO_3F$), hereinafter for convenience termed "mono-acid," indicating a side reaction probably resulting in hydrolysis of some of the di-acid originally supplied, and after the vacuum treatment about 75% of the monofluoride, about 21% mono-acid and traces of other compounds probably including unreacted di-acid ($HPO_2F_2$), di-ethylmonofluorophosphate ($C_2H_5)_2PO_3F$, orthophosphoric acid ($H_3PO_4$) and perhaps also mono-ethyl phosphoric acid ($C_2H_5H_2PO_4$).

The reagents employed in the foregoing example were those available in the laboratory and it was believed the di-acid, which had aged somewhat, had probably hydrolyzed before being used, with resultant production of some mono-acid which remained in it. The procedure was therefore repeated using freshly distilled substantially pure di-acid but with an amount of alcohol substantially 50% in excess of the stoichiometric equivalent. After the reaction mass had been allowed to stand for a time it was subjected to like vacuum treatment and subsequent distillation by short path means showed 8% of the residue non-distillable. The crude recovery of monohydroxy mono-ethoxy phosphoryl monofluoride appeared to be less than the theoretical quantity, with about 35% of the latter being obtained at a purity of 94–95%. Thus while an excess of alcohol apparently tends to promote the reaction toward completion and to encourage the attainment of an equilibrium it also tends to induce decomposition of some of the monofluoride although facilitating recovery of the remainder in a relatively pure state.

As an example of the preparation of a monohydroxy monohydrocarbonoxy phosphoryl monofluoride containing a branched chain higher hydrocarbon group, 51 g. of isopropyl alcohol ($C_3H_7OH$) was reacted with 50 g. of the di-acid, the alcohol being substantially 70% in excess of stoichiometric proportions, and after standing overnight and then being subjected to vacuum treatment for about 3 hours at approximately 75° C. the residue of 50 g., approximately 69.6% of the theoretical quantity, through numerous fractionations by short path distillation yielded approximately 25% of the theoretical amount of the isopropyl half ester having a fluorine content of 14.9–15% as compared to the theoretical 13.37%. The product obtained in the manner just described moreover was contaminated by a small quantity of di-acid and isolation of the monofluoride therefrom was effected by neutralizing the ester to form salts easily separable from the said di-acid or salts thereof by absolute ethyl alcohol extraction and precipitation with acetone, the monofluoride being reconstituted from the salt by treatment of the precipitate with a mineral acid.

Sodium ethylmonofluorophosphate and sodium isopropyl-monofluorophosphate of substantially a 95% purity isolated in the aforesaid way from the respective products comprise little or no unreacted di-acid or salts thereof.

Methyl alcohol ($CH_3OH$) reacts substantially like ethyl alcohol and affords a relatively high yield of monohydroxy monomethoxy phosphoryl monofluoride, up to 88% or more of theoretical, but higher alcohols, i. e. those of four or more carbon atoms normally require somewhat different separation procedures because of the higher boiling points and greater viscosity of the monohydroxy phosphoryl monofluorides produced therefrom. Thus whereas with methyl, ethyl, or propyl alcohols the reaction mixture is a relatively non-viscous liquid which can be subjected to fraction distillation under reduced pressure to obtain the desired acid ester, the mixture with butyl alcohol is a viscous liquid from which the higher acid ester cannot be readily distilled and as the molecular weight increases the reaction mixtures become semisolids quite unamenable to separation by distillation, techniques of which may produce extensive decomposition, even under very low pressure.

Furthermore Equation 1 usually not only does not proceed to completion as to either starting material but tends to produce side reaction products, particularly with the higher alcohols which further complicate separation procedures. After the mass has attained equilibrium it therefore may be neutralized with sodium hydroxide solution and the sodium monohydrocarbonoxy monofluorophosphate ($NaRPO_3F$) containing the hydrocarbon group of the selected higher alcohol which was used as a starting material then extracted by dissolving in absolute (ethyl) alcohol. This normally also takes into solution any residual traces of the starting higher alcohol and possibly some intermediate orthophosphate esters, but after concentration of the extraction solution by evaporation to about one-tenth its original volume the $NaRPO_3F$ may be precipitated by addition of acetone and the fluorophosphate ester then reconstituted by addition of a mineral acid to the precipitate. This procedure, however, is not useful for recovering the phosphoryl monofluorides corresponding to the lower alcohols of the methyl, ethyl and propyl groups because of the relative insolubility in ethyl alcohol of the corresponding sodium monofluorides, but if potassium hydroxide (KOH) be substituted for sodium hydroxide as a neutralizing agent for the reaction mass, the corresponding potassium compounds ($KRPO_3F$) produced are soluble in absolute alcohol and extraction of them and reconstitution of the acid monofluorides are accomplished in the manner above described.

Normal butyl alcohol ($CH_3CH_2CH_2CH_2OH$) reacts rather slowly to produce the corresponding butyl ester and separation of it from the reaction mass in a relatively pure state may be facilitated by special procedures, such as addition of water and sodium chloride to reduce the solubility of some of the organic compounds produced in side or incomplete reactions.

Normal octyl alcohol ($CH_3(CH_2)_6CH_2OH$) and dodecyl (lauryl) alcohol ($CH_3(CH_2)_{10}CH_2OH$) likewise yield corresponding esters although in their production, even with an excess of the alcohol, it is difficult to obtain yields of the esters materially in excess of about 50% of the theoretical quantity calculated from the amounts of di-acid supplied.

To demonstrate the applicability of the method to even longer chain alcohols, cetyl alcohol ($C_{16}H_{33}OH$) was reacted with di-acid and some monohydroxy monocetoxy phosphoryl monofluoride was recovered in substantially the same manner; here, also, the yield was only about 50% of theoretical.

I have herein described the invention with considerable particularity, especially as it may be employed in the manufacture of monohydroxy mono-alkoxy phosphoryl monofluorides from certain specific monohydric alcohols of the aliphatic series but it will be understood I do not desire or intend thereby to limit or confine the invention thereto in any way, having mentioned the said alcohols and their specific reactions merely as exemplifying the practice of my method which may be utilized in a similar manner for the production of corresponding esters from other monohydric alcoholic compounds of the aliphatic series; moreover, changes and modifications in the specific procedures adopted for isolating and recovering the final products as well as in other respects will readily occur to those skilled in the art and may be employed if desired without departing from the spirit and scope of the invention as defined in the appended claims.

Having thus described my invention I claim and desire to protect by Letters Patent of the United States:

1. The method of producing a monohydroxy saturated hydrocarbonoxy phosphoryl monofluoride which comprises mixing difluorophosphoric acid and a monohydric saturated hydrocarbon alcohol and, after the reaction has proceeded to substantial completion, isolating from the reaction mass the monohydroxy saturated hydrocarbonoxy phosphoryl monofluoride of the said alcohol.

2. The method according to claim 1 in which the alcohol contains less than four carbon atoms per molecule and the isolating treatment includes high-vacuum short-path distillation of the reaction mass.

3. The method of producing monohydroxy monoethoxy phosphoryl monofluoride which comprises mixing ethyl alcohol and difluorophosphoric acid and after the reaction has proceeded to substantial completion, subjecting the reaction mass to vacuum distillation at a temperature and for a time sufficient to distill off unreacted alcohol, and then subjecting the residue to short path distillation to thereby isolate monohydroxy monoethoxy phosphoryl monofluoride.

4. The method of producing monohydroxy mono-isopropoxy phosphoryl monofluoride which comprises reacting difluorophosphoric acid and isopropyl alcohol and, after the reaction has proceeded to substantial completion, subjecting the reaction mass to vacuum distillation at a temperature and for a time sufficient to distill off unreacted alcohol, and then fractionating the residue by short path distillation to thereby isolate monohydroxy mono-isopropoxy phosphoryl monofluoride.

5. The method of producing a monohydroxy saturated hydrocarbonoxy phosphoryl monofluoride which comprises mixing difluorophosphoric acid with a monohydric saturated hydrocarbon alcohol containing more than three carbon atoms per molecule, after attainment of substantial equilibrium in the reacting mass neutralizing the latter with an alkali to thereby convert the phosphoryl monofluoride of said alcohol to an alkali-metal salt, subjecting the mass to extraction treatment by absolute ethyl alcohol, separating the liquid from the solids in the treated mass, substantially reducing the volume of the separated liquid by evaporation, adding acetone to the remaining liquid to form a precipitate consisting substantially entirely of said phosphoryl monofluoride metal salt, reacting the precipitate with a mineral acid, and finally separating the resultant alkali salt of said acid from the reconstituted phosphoryl monofluoride.

6. The method of producing monohydroxy monocetoxy phosphoryl monofluoride which comprises mixing difluorophosphoric acid and cetyl alcohol and, after the reaction has proceeded to substantial completion, neutralizing the reaction mass with an alkali and then extracting from the residue an alkali-metal salt of monohydroxy monocetoxy phosphoryl monofluoride and recreating the monofluoride by treatment of said compound with a mineral acid.

References Cited in the file of this patent

UNITED STATES PATENTS 2,614,116    Lange et al. _____ Oct. 14, 1952